(12) United States Patent
Blumberg et al.

(10) Patent No.: US 7,640,913 B2
(45) Date of Patent: Jan. 5, 2010

(54) SINGLE NOZZLE INJECTION OF GASOLINE AND ANTI-KNOCK FUEL

(75) Inventors: Paul N. Blumberg, Southfield, MI (US); Leslie Bromberg, Sharon, MA (US); John Heywood, Newton, MA (US); Daniel R. Cohn, Cambridge, MA (US)

(73) Assignee: Ethanol Boosting Systems, LLC, Cambridge, MA (US)

( * ) Notice: Subject to any disclaimer, the term of this patent is extended or adjusted under 35 U.S.C. 154(b) by 0 days.

(21) Appl. No.: 11/682,372

(22) Filed: Mar. 6, 2007

(65) Prior Publication Data

US 2008/0046161 A1 Feb. 21, 2008

Related U.S. Application Data

(60) Provisional application No. 60/780,319, filed on Mar. 8, 2006.

(51) Int. Cl.
*F02M 43/00* (2006.01)
*F02D 28/00* (2006.01)
(52) U.S. Cl. .......... 123/304; 123/431; 123/577
(58) Field of Classification Search ......... 123/447, 123/1 A, 300, 304, 431, 478, 575, 577, 198 C, 123/198 A
See application file for complete search history.

(56) References Cited

U.S. PATENT DOCUMENTS

| | | | |
|---|---|---|---|
| 2,741,230 A * | 4/1956 | Reynolds | ......... 123/304 |
| 3,089,470 A | 5/1963 | Payne | |
| 3,106,194 A | 10/1963 | Cantwell et al. | |
| 3,557,763 A | 1/1971 | Probst | |
| 4,031,864 A * | 6/1977 | Crothers | ......... 123/1 A |
| 4,056,087 A | 11/1977 | Boyce | |
| 4,182,278 A | 1/1980 | Coakwell | |
| 4,230,072 A | 10/1980 | Noguchi et al. | |
| 4,312,310 A | 1/1982 | Chivilo' et al. | |
| 4,402,296 A | 9/1983 | Schwarz | |
| 4,480,616 A | 11/1984 | Takeda | |
| 4,541,383 A | 9/1985 | Jessel | |
| 4,594,201 A | 6/1986 | Phillips et al. | |
| 4,596,277 A | 6/1986 | Djordjevic | |
| 4,721,081 A | 1/1988 | Krauja et al. | |

(Continued)

OTHER PUBLICATIONS

A. Modak and L.S. Carletto, "Engine Cooling by Direct Injection of Cooling Water," Society of Automotive Engineers, Inc., 700887.
Julian A. LoRusso and Harry A. Cikanek, "Direct Injection Ignition Assisted Alcohol Engine," Society of Automotive Engineers, Inc., 880495, International Contress and Exposition in Detroit, Michigan (Feb. 29-Mar. 5, 1998).

(Continued)

*Primary Examiner*—Stephen K Cronin
*Assistant Examiner*—Arnold Castro
(74) *Attorney, Agent, or Firm*—Nields, Lemack & Frame, LLC

(57) ABSTRACT

Fuel management system for operation of a spark ignition engine. The system includes a source of gasoline and a source of anti-knock fuel. A proportioning valve receives the gasoline and the anti-knock fuel to discharge a mixture having a controlled gasoline/anti-knock fuel ratio. A single high pressure pump receives the mixture and delivers the mixture to an injector. A fuel management control system controls the proportioning valve and the injector for injection of the mixture into a cylinder of the engine to control knock. A preferred anti-knock fuel is ethanol.

11 Claims, 4 Drawing Sheets

U.S. PATENT DOCUMENTS

| | | | |
|---|---|---|---|
| 4,958,598 | A | 9/1990 | Fosseen |
| 4,967,714 | A | 11/1990 | Inoue |
| 4,974,416 | A | 12/1990 | Taylor |
| 4,993,386 | A | 2/1991 | Ozasa et al. |
| 5,179,923 | A | 1/1993 | Tsurutani et al. |
| 5,233,944 | A | 8/1993 | Mochizuki |
| 5,497,744 | A | 3/1996 | Nagaosa et al. |
| 5,560,344 | A * | 10/1996 | Chan ................ 123/515 |
| 5,715,788 | A | 2/1998 | Tarr et al. |
| 5,884,597 | A * | 3/1999 | Hiraku et al. ......... 123/179.17 |
| 5,911,210 | A * | 6/1999 | Flach .................. 123/527 |
| 5,937,799 | A | 8/1999 | Binion |
| 5,983,855 | A | 11/1999 | Benedikt et al. |
| 6,032,632 | A | 3/2000 | Bolenz et al. |
| 6,073,607 | A | 6/2000 | Liber |
| 6,076,487 | A | 6/2000 | Wulff et al. |
| 6,098,584 | A | 8/2000 | Ahner et al. |
| 6,260,525 | B1 | 7/2001 | Moyer |
| 6,287,351 | B1 | 9/2001 | Wulff et al. |
| 6,298,838 | B1 | 10/2001 | Huff et al. |
| 6,321,692 | B1 | 11/2001 | Rayner |
| 6,332,448 | B1 | 12/2001 | Ilyama et al. |
| 6,340,015 | B1 | 1/2002 | Benedikt et al. |
| 6,358,180 | B1 | 3/2002 | Kuroda et al. |
| 6,508,233 | B1 | 1/2003 | Suhre et al. |
| 6,513,505 | B2 | 2/2003 | Watanabe et al. |
| 6,536,405 | B1 | 3/2003 | Rieger et al. |
| 6,543,423 | B2 | 4/2003 | Dobryden et al. |
| 6,561,157 | B2 | 5/2003 | zur Loye et al. |
| 6,575,147 | B2 | 6/2003 | Wulff et al. |
| 6,668,804 | B2 | 12/2003 | Dobryden et al. |
| 6,672,290 | B2 * | 1/2004 | Ricco ................ 123/514 |
| 6,725,827 | B2 | 4/2004 | Ueda et al. |
| 6,745,744 | B2 | 6/2004 | Suckewer et al. |
| 6,748,918 | B2 | 6/2004 | Rieger et al. |
| 6,755,175 | B1 | 6/2004 | McKay et al. |
| 6,799,551 | B2 | 10/2004 | Nakakita et al. |
| 6,834,632 | B2 | 12/2004 | Kataoka et al. |
| 6,892,691 | B1 | 5/2005 | Uhl et al. |
| 6,951,202 | B2 | 10/2005 | Oda |
| 6,955,154 | B1 | 10/2005 | Douglas |
| 6,990,956 | B2 | 1/2006 | Niimi |
| 7,013,847 | B2 | 3/2006 | Auer |
| 7,021,277 | B2 | 4/2006 | Kuo et al. |
| 7,077,100 | B2 | 7/2006 | Vogel et al. |
| 7,077,105 | B2 | 7/2006 | Oda et al. |
| 7,086,376 | B2 | 8/2006 | McKay |
| 7,156,070 | B2 | 1/2007 | Strom et al. |
| 7,188,607 | B2 | 3/2007 | Kobayashi |
| 7,201,136 | B2 | 4/2007 | McKay et al. |
| 7,207,304 | B2 | 4/2007 | Iwatsuki et al. |
| 7,207,306 | B2 | 4/2007 | Kondo |
| 7,212,910 | B2 | 5/2007 | Akasaka |
| 7,225,787 | B2 * | 6/2007 | Bromberg et al. ....... 123/198 A |
| 7,263,959 | B2 | 9/2007 | Kataoka et al. |
| 7,314,033 | B2 | 1/2008 | Cohn et al. |
| 7,320,302 | B2 | 1/2008 | Kobayashi |
| 7,395,786 | B2 | 7/2008 | Leone et al. |
| 7,444,987 | B2 | 11/2008 | Cohn et al. |
| 2002/0139321 | A1 * | 10/2002 | Weissman et al. ........... 123/1 A |
| 2005/0056264 | A1 * | 3/2005 | Weissman et al. ........... 123/577 |
| 2005/0109316 | A1 * | 5/2005 | Oda ................ 123/406.29 |
| 2006/0102146 | A1 * | 5/2006 | Cohn et al. ........... 123/406.29 |
| 2007/0119416 | A1 * | 5/2007 | Boyarski ................ 123/304 |
| 2007/0119424 | A1 * | 5/2007 | Leone et al. ............ 123/461 |
| 2008/0115759 | A1 | 5/2008 | Russell |
| 2008/0120008 | A1 | 5/2008 | Russell |

OTHER PUBLICATIONS

Borje Grandin, et al., "Knock Suppression in a Turbocharged SI Engine by Using Cooled EGR," Society of Automotive Engineers, Inc., 982476, International Fall Fuels and Lubricants Meeting and Exposition in San Francisco, California (Oct. 19-22, 1998).

Borje Grandin and Hans-Erik Angstrom, "Replacing Fuel Enrichment in a Turbo Charged SI Engine: Lean Burn or Cooled EGR," Society of Automotive Engineers, Inc., 1999-01-3505.

C. Stan, et al., "Internal Mixture Formation and Combustion—from Gasoline to Ethanol," Society of Automotive Engineers, Inc., 2001-01-1207.

USPTO Non-Final Office Action, U.S. Appl. No. 10/991,774, filed Apr. 25, 2006.

USPTO Final Office Action, U.S. Appl. No. 10/991,774, filed Sep. 27, 2006.

USPTO Non-Final Office Action, U.S. Appl. No. 10/991,774, filed May 25, 2007.

USPTO Non-Final Office Action, U.S. Appl. No. 11/100,026, filed Aug. 3, 2006.

Fikret Yuksel and Bedri Yuksel, "The Use of Ethanol-Gasoline Blend as a Fuel in an SI Engine," Renewable Energy, vol. 29 (2004) pp. 1181-1191.

USPTO Non-Final Office Action, U.S. Appl. No. 11/229,755, filed Mar. 22, 2007.

USPTO Non-Final Office Action, U.S. Appl. No. 11/229,755, filed Oct. 4, 2007.

USPTO Non-Final Office Action, U.S. Appl. No. 11/682,372, filed Jan. 2, 2008.

USPTO Final Office Action, U.S. Appl. No. 11/682,372, filed Oct. 17, 2008.

USPTO Non-Final Office Action, U.S. Appl. No. 11/684,100, filed Jun. 3, 2008.

PCT International Search Report and Written Opinion, Application No. PCT/IB07/03004, Jul. 9, 2008.

PCT International Search Report and Written Opinion, Application No. PCT/US07/05777, Mar. 24, 2008.

PCT International Search Report and Written Opinion, Application No. PCT/US07/74227, Feb. 25, 2008.

PCT International Search Report and Written Opinion, Application No. PCT/US08/69171, Oct. 3, 2008.

USPTO Non-Final Office Action, U.S. Appl. No. 11/840,719, filed Jul. 11, 1008.

PCT International Search Report and Written Opinion, Appl. No. PCT/US05/041317, Apr. 6, 2006.

PCT International Search Report and Written Opinion, Appl. No. PCT/US06/012750, Jun. 28, 2007.

J.B. Heywood, "Internal Combusion Engine Fundamentals," McGraw Hill, 1988, p. 477.

J. Stokes et al., "A gasoline engine concept for improved fuel economy - the lean-boost system," SAE paper 2001-01-2902, pp. 1-12.

H. J. Curran et al., "A comprehensive modeling study of iso-octane oxidation," Combustion and Flame 129:263-280 (2002) pp. 253-280.

B. Lecointe and G. Monnier, "Downsizing a gasoline engine using turbocharging with direct injection" SAE paper 2003-01-0542.

USPTO Notice of Allowance, U.S. Appl. No. 11/684,100, Mar. 3, 2009.

PCT International Search Report, Application No. PCT/US07/06142, Jul. 3, 2008.

USPTO Non-Final Office Action, U.S. Appl. No. 11/683,564, Mar. 13, 2009.

Chinese Intellectual Property Office Action, Application No. 200580046751.6, Dec. 19, 2008.

L. Bromberg et al., "Calculations of Knock Suppression in Highly Turbocharged Gasoline/Ethanol Engines Using Direct Ethanol Injection," Jul. 7, 2005, MIT Paper.

PCT Written Opinion, Application No. PCT/US07/06142, Jul. 3, 2008.

* cited by examiner

SINGLE NOZZLE INJECTION OF GASOLINE AND ANTI-KNOCK FUEL

This application claims priority to provisional application Ser. No. 60/780,319 filed Mar. 8, 2006, the contents of which are incorporated herein by reference.

BACKGROUND OF THE INVENTION

This invention relates to gasoline engines and more particularly to a single nozzle injection system for cost minimization and knock control.

The addition of an anti-knock fuel such as ethanol is very attractive for producing highly efficient gasoline engines. Anti-knock systems are known that utilize multiple sets of injectors resulting in a complex and thus expensive system. It is also known to inject gasoline and an anti-knock fuel such as ethanol through the same nozzle using a single plenum and one valve. Such an arrangement is disclosed in U.S. patent application Ser. No. 10/991,774 filed Nov. 18, 2004. The contents of this application are incorporated herein by reference in their entirety. This pending patent application does not, however, disclose how to mix the gasoline and ethanol before reaching the injector and in particular does not disclose any means for mixing the ethanol and gasoline so as to minimize the cost of the system through the use of a single high pressure pump.

SUMMARY OF THE INVENTION

In one aspect, the fuel management system of the invention for operation of a spark ignition engine includes a gasoline engine, a source of gasoline and a source of anti-knock fuel such as ethanol. A proportioning valve receives the gasoline and anti-knock fuel to discharge a mixture having a controlled gasoline/anti-knock fuel ratio. A high pressure pump receives the mixture, pressurizes it, and delivers the mixture to an injector. A fuel management control system controls the proportioning valve and the injector for injection of the mixture into a cylinder of the engine to control knock. A preferred anti-knock fuel is ethanol or ethanol blends. In a preferred embodiment, the proportioning valve is driven by an actuator employing rotation or translation of elements to vary the gasoline/anti-knock fuel ratio. In one embodiment, the proportioning valve is located upstream of the high pressure pump. The proportioning valve preferably allows an arbitrarily selected ratio of gasoline to anti-knock fuel including either all gasoline or all ethanol.

In a preferred embodiment, the volume of the mixture between the high pressure pump and the injector is minimized to improve transient performance of the fuel management system. A preferred embodiment also includes a first low pressure pump for delivering the gasoline to the proportioning valve and a second low pressure pump for delivering the anti-knock fuel to the proportioning valve. It is preferred that the mixture be injected into a cylinder in the engine under pulse width modulation control.

In yet another aspect, the invention is a fuel management system for operation of a spark ignition engine including a gasoline engine, a source of gasoline and a source of anti-knock fuel. A high pressure pump receives the gasoline and anti-knock fuel and includes two vanes for separate pressurization of the gasoline and anti-knock fuel. A proportioning valve receives the pressurized gasoline and anti-knock fuel to discharge a mixture having a controlled gasoline/anti-knock fuel ratio. An injector receives the mixture from the proportioning valve and a fuel management control system controls the proportioning valve and injector for injection of the mixture into a cylinder of an engine.

In order to achieve fast time response, required during transients from low torque to high torque, for example, there is a delay due to the fuel that fills the fuel line and/or fuel rail. One possible means of achieving fast response is to allow, by opening of a valve, to return the fuel in the fuel rail or fuel system back to one of the tanks. Relatively small amounts of fuel need to be flushed, allowing the fuel line and/or fuel rail to fill with fuel with the appropriate composition. In order not to change the composition of the anti-knock fuel, the purged fuel can be returned to the larger gasoline tank.

DESCRIPTION OF THE PREFERRED EMBODIMENTS

Figure 1:
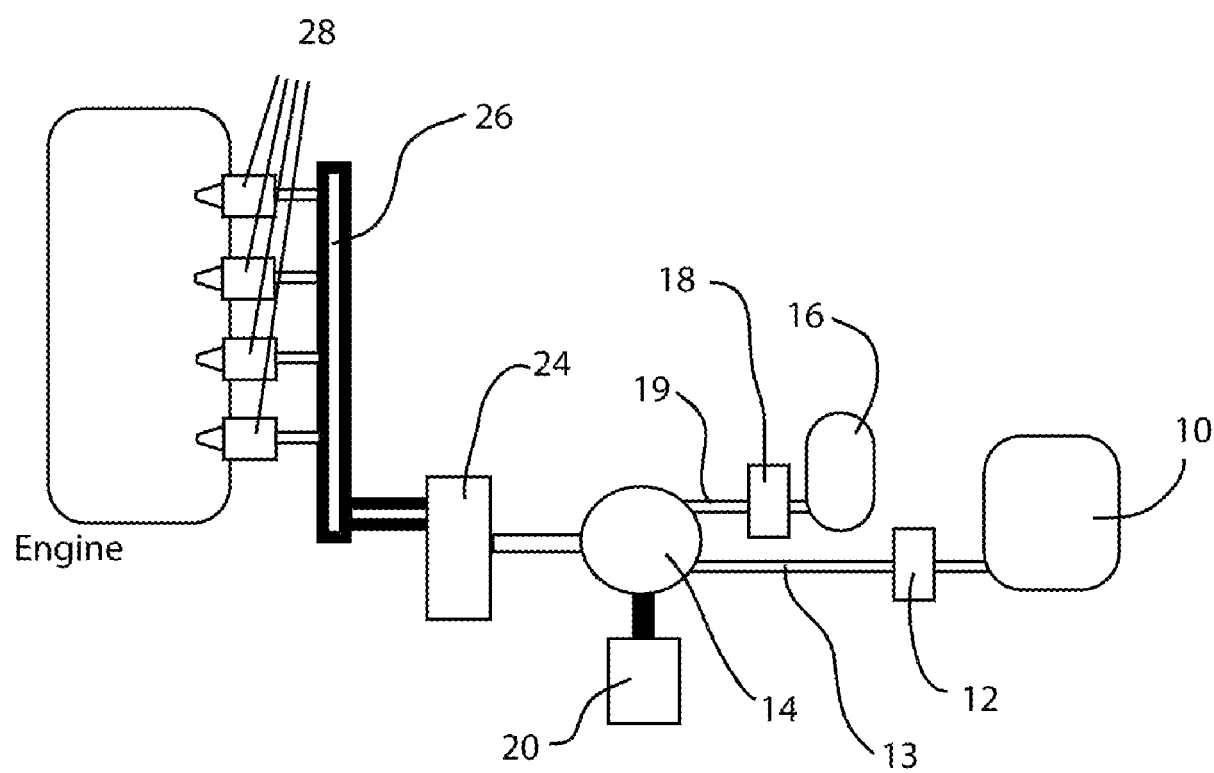
FIG. 1 is a schematic diagram of a first embodiment of the invention disclosed herein.
Figure 2:
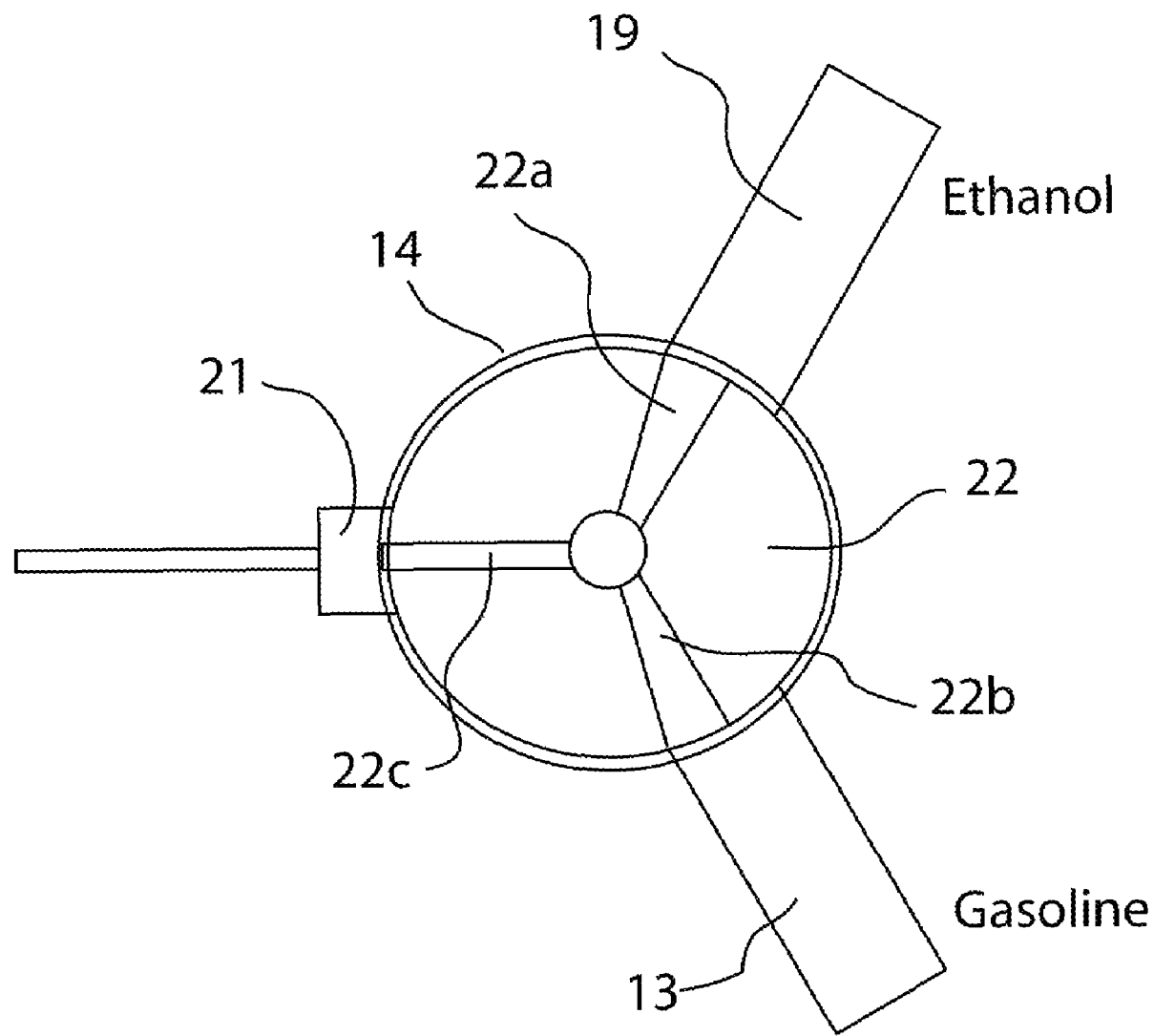
FIG. 2 is a cross-sectional view of an illustrative proportioning valve for use in embodiments of the invention.

With reference first to FIG. 1, gasoline from a gasoline tank 10 is pumped by means of a low pressure pump 12 to a proportioning valve 14 through fuel line 13. Similarly, an anti-knock fuel such as ethanol from an ethanol tank 16 is pumped by a low pressure pump 18 to the proportioning valve 14 through fuel-line 19. FIG. 2 is a schematic illustration of a suitable proportioning valve 14 in which an actuator (not shown) actuates by rotation an inner drum 22 that decreases one stream and increases the other. In the illustrative design, when the inner drum 22 rotates clockwise the overlapping region between gasoline fuel line 13 and the gasoline tube 22b in inner drum 22 decreases while the overlapping region between ethanol fuel line 19 and the ethanol tube 22a in inner drum 22 remains constant. Thus the gasoline content of the fuel flowing into the proportional valve 14 can be decreased after a clockwise rotation of the inner drum 22. Conversely, when the inner drum rotates counter clockwise the overlapping region between gasoline fuel line 13 and the gasoline tube 22b in inner drum 22 remains constant while the overlapping region between ethanol fuel line 19 and the ethanol tube 22a in inner drum 22 decreases. Thus the gasoline/ethanol content of the fuel flowing into the proportional valve 14 can be controlled by rotating the inner drum 22. The output pipe 22c of proportional valve 14 feeds output plenum 21 throughout all possible positions of inner drum 22.

In the illustrative case in FIG. 2, mixing of the gasoline and antiknock fuel takes place in the body of the inner drum 22. It is possible to keep the two fuels separate through output plenum 21.

In this way, the ratio of gasoline to ethanol may be controlled precisely.

Although a proportional valve through rotation is illustrated in FIG. 2, the embodiment includes any proportional valve that achieves control of flow ratio between ethanol and gasoline. In particular, linear proportional valves that operate on the same principle can also be envisioned.

One advantage of the valve shown in FIG. 2 is that in the case that one of the two fluids is exhausted, it is possible to close the appropriate valve to prevent liquid from one tank from being introduced into the second tank. Thus the ethanol tank can be isolated by counter-clockwise rotation of the inner drum 22.

Returning to FIG. 1, the output of the proportioning valve 14 which is a mixture of gasoline and anti-knock fuel is introduced into a single high pressure pump 24. The high pressure pump 24 delivers the gasoline/anti-knock fuel mixture into a fuel rail 26 and then into injectors 28. It is preferred that injection of the gasoline/anti-knock fuel mixture be controlled by using pulse width modulation control of the injectors 28. In operation, the proportioning valve 14 controls the gasoline/anti-knock fuel ratio and pulse width modulation of the injectors is used to control the total amount of mixture introduced into the engine.

Since the embodiment shown in FIG. 1 uses an injector for injecting a mixture of the gasoline and anti-knock fuel, the injector is always being used when the engine is running. That is, if ethanol has been used up and is unavailable, nonetheless the injectors 28 continue to operate with gasoline. Therefore, the injectors 28 are less likely to become fouled. In this embodiment, when ethanol is exhausted the proportioning valve injects only gasoline. Similarly, if gasoline is exhausted, the proportional valve 14 injects only ethanol.

The embodiment shown in FIG. 1 requires injectors with greater capacity and larger dynamic range since the flow through them varies more than in a conventional GDI engine (ethanol flow is substantially larger than that of gasoline for comparable power). Variable fuel-rail 26 pressure can be used to partially address the requirements of large dynamic loads.

Those skilled in the art will appreciate that the configuration in FIG. 1 may result in decreased time response of the ethanol/gasoline mixture because the mixture residing in the region after the proportioning valve 14 (that is, in the high pressure pump 24 and in fuel rail 26) has to be consumed before there can be a change in the gasoline/ethanol ratio of the fuel into the cylinders. It is therefore important to minimize the volume between the proportioning valve 14, the high pressure fuel pump 24 and the fuel rail 26. In conventional direct injection systems, the time lag is about one second determined by the ratio of the volume of the fluid between the injectors and the fuel pump and the volumetric flow rate of the fuel. Reduced times are possible through careful design of the injector system having decreased volumes.

Those of ordinary skill in the art will recognize that the proportioning valve 14 may be incorporated into the high pressure pump 24 if desired. It is also apparent that fuel may be recirculated for pump cooling with either the gasoline/ethanol or both prior to mixing.

Figure 4:
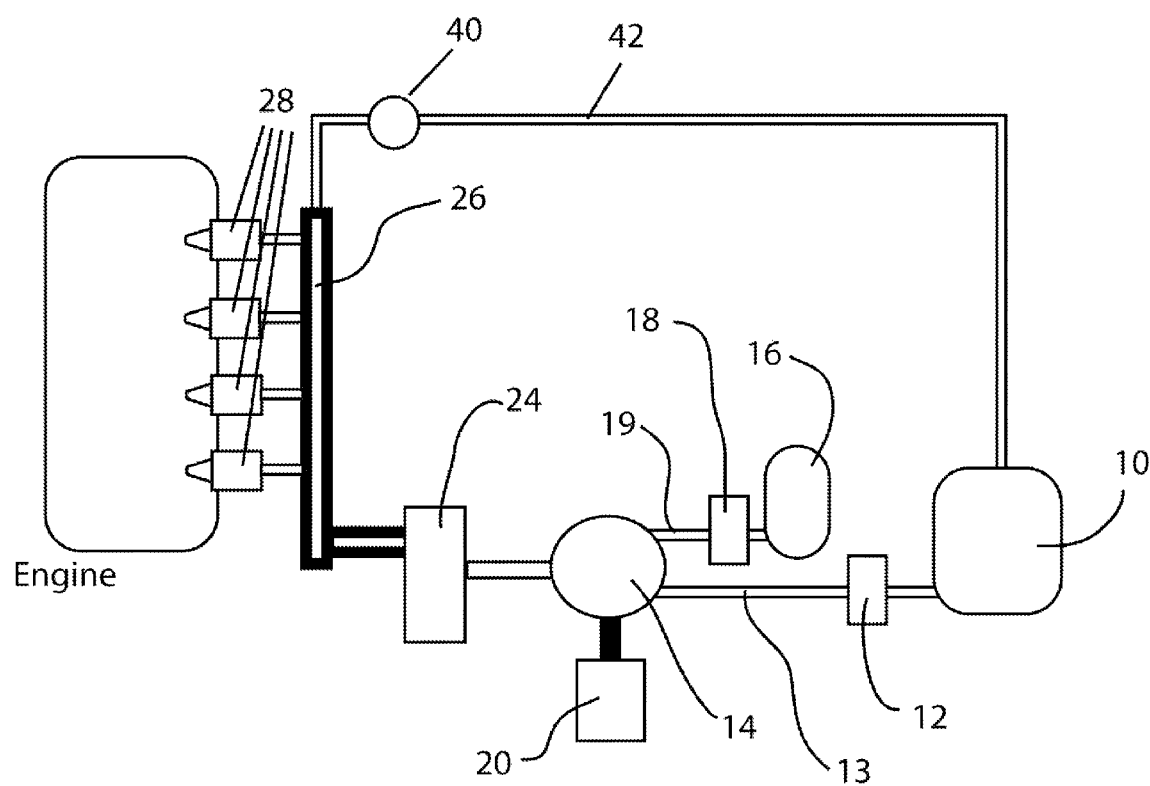
FIG. 4 is a schematic illustration of a fueling management and injection system that shows a return path from the fuel rail to the main gasoline tank.

Alternatively as shown in FIG. 4, a return path for the fuel downstream from the proportional valve 24 but upstream from the injectors 28 can be purged by opening a valve 40 connected to the fuel rail. The valve can return fuel to either ethanol tank 16 or preferably to gasoline tank 10 through a return fuel line 42. Although the composition of the gasoline in tank 10 could be varying because of the introduction of gasoline/ethanol mixtures, the fuel volume that needs to be purged from the injectors is small. In order to minimize the effect, the purging occurs only when the demand for ethanol increases, such as during transients to higher torque, in order to prevent engine knock. The opposite occurrence, when the engine torque decreases, does not require purging of the fuel between the proportional valve and the injectors.

Figure 3:
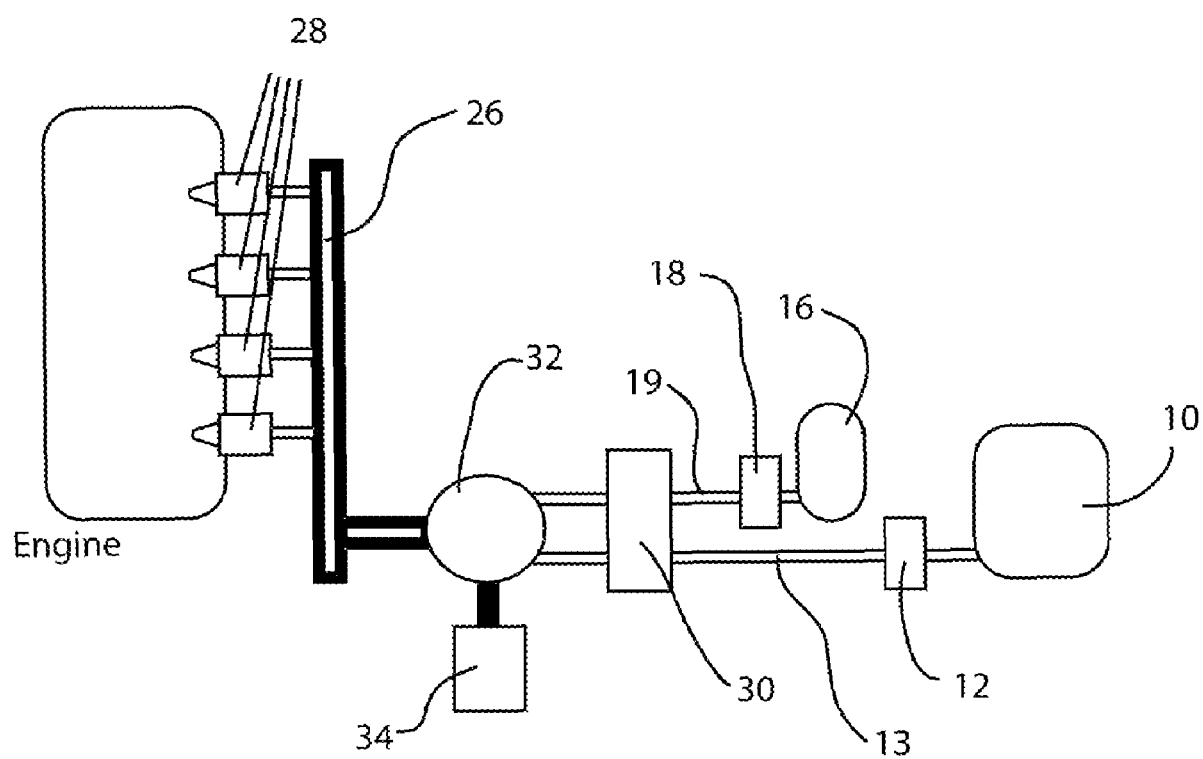
FIG. 3 is a schematic illustration of another embodiment of the invention.

Another embodiment of the invention will now be described in conjunction with FIG. 3. In this embodiment, the gasoline and ethanol are introduced into the single high pressure pump 30. In this embodiment, the single high pressure pump 30 includes two vanes for separately pressurizing the gasoline and ethanol. The pressurized gasoline/ethanol then enters high-pressure proportioning valve 32 under the control of the actuator 34 and then proceeds into the fuel rail 26. From there, the mixture is injected through the injectors 28 as in the case of the embodiment of FIG. 1. A significant aspect from the present invention is that both the embodiments shown in FIGS. 1 and 3 utilize a single high pressure pump 24 (in FIG. 1) or 30 (in FIG. 3) resulting in a cost effective system. Those of ordinary skill in the art will also recognize that the injectors may have two valves with a single nozzle (with mixing in a plenum upstream from the nozzle), or two valves and two nozzles that would require two fuel rails.

It is also possible in this embodiment to purge the fuel downstream from the proportional valve under conditions where a rapid increase in the ethanol content of the fuel is required, such as during transients to high torque. A smaller volume of fuel needs to be purged compared with the embodiment in FIG. 1, as the proportional valve 32 in FIG. 3 is closer to the injectors than the corresponding valve 14 in FIG. 1.

The tendency of an engine to knock while in transition from low to high torque is typically delayed. In part, this delay is due to the fact that initially after the transition begins, the cylinder walls are colder (from the lower torque operation), minimizing knock in the early cycles of the transition to a high torque regime. Therefore, any delay in adjustment of the fuel mix ratio into the cylinder is partially offset by the delay of onset of knocking conditions in the engine.

An active means to avoid knock during transients when the system is loaded with lower fractions of ethanol than required for avoiding knock, is to operate for short periods of time under fuel rich conditions. Spark timing can also be retarded during the fuel transient in the injection system. A combination of fuel rich operation as well as spark retard can be used under some conditions during the transient.

It is recognized that modifications and variations of the invention disclosed herein will be apparent to those of ordinary skill in the art and it is intended that all such modifications and variations be included with the scope of the appended claims.

What is claimed is:

1. Fuel management system for operation of a spark ignition gasoline engine comprising:
   a gasoline engine;
   a source of liquid gasoline;
   a source of liquid anti-knock fuel;
   a proportioning valve receiving the gasoline and anti-knock fuel to discharge a liquid mixture through a first conduit having a controlled gasoline/anti-knock fuel ratio;
   a high pressure pump receiving the mixture through the first conduit and delivering the mixture through a second conduit to an injector; and
   a fuel management control system for controlling the proportioning valve and the injector for injection of the mixture into a cylinder of the engine to control knock
   wherein the volume within the first conduit, the high pressure pump, and the second conduit is minimized to improve transient response of the fuel management system.

2. The system of claim 1 wherein the proportioning valve is driven by an actuator.

3. The system of claim 2 wherein the proportioning valve is upstream of the high pressure pump.

4. The system of claim 2 wherein the proportioning valve employs rotation or translation of elements to vary the gasoline/anti-knock fuel composition.

5. The system of claim 4 wherein the proportioning valve allows an arbitrarily selected ratio of gasoline to anti-knock fuel including either all gasoline or all anti-knock fuel.

6. The system of claim 1 wherein the fuel downstream from the proportioning valve is purged for rapid modification the fuel mixture, when ethanol content demand increases because of transient to high torque.

7. The system of claim 6 where the purged fuel is returned to the main gasoline tank 8. The system of claim 1 further including a first low pressure pump for delivering the gasoline to the proportioning valve, and a second low pressure pump for delivering the anti-knock fuel to the proportioning valve.

9. The system of claim 1 wherein the mixture is injected into the cylinder under pulse width modulation control.

10. The system of claim 1 wherein the anti-knock fuel is ethanol or ethanol blends.

11. Fuel management system for operation of a spark ignition engine comprising:

a gasoline engine;
a source of gasoline;
a source of anti-knock fuel;
a high pressure pump receiving the gasoline and anti-knock fuel and including two vanes for separate pressurization of the gasoline and anti-knock fuel;
a high pressure proportioning valve receiving the pressurized gasoline and anti-knock fuel to discharge a mixture having a controlled gasoline/anti-knock ratio;
an injector for receiving the mixture from the proportioning valve; and
a fuel management control system for controlling the proportioning valve and injector for injection of the mixture into a cylinder of an engine
wherein the volume of the mixture between the high pressure pump and the injector is minimized to improve transient response of the fuel management system.

* * * * *